United States Patent
Keddis (10) Patent No.: US 10,341,039 B1
(45) Date of Patent: Jul. 2, 2019

(54) METHODS AND APPARATUS FOR SEPARATING THE WAVELENGTH SWITCHING FUNCTION FROM THE CHANNEL EQUALIZATION FUNCTION IN A RECONFIGURABLE OPTICAL ADD/DROP MULTIPLEXER (ROADM)

(71) Applicant: Juniper Networks, Inc., Sunnyvale, CA (US)

(72) Inventor: Essam Tony Keddis, Petaluma, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 15/392,227

(22) Filed: Dec. 28, 2016

(51) Int. Cl.
  *H04B 10/079* (2013.01)
  *H04Q 11/00* (2006.01)
  *H04J 14/02* (2006.01)

(52) U.S. Cl.
  CPC .... *H04J 14/0212* (2013.01); *H04B 10/07955* (2013.01); *H04Q 11/0005* (2013.01); *H04Q 2011/0016* (2013.01)

(58) Field of Classification Search
  CPC ........... H04J 14/0212; H04B 10/07955; H04Q 11/0005; H04Q 2011/0016
  See application file for complete search history.

(56) References Cited

U.S. PATENT DOCUMENTS

| 5,926,590 A | 7/1999 | Mao | |
| 2003/0223747 A1* | 12/2003 | Olier | H04B 10/07955 398/43 |
| 2004/0100684 A1* | 5/2004 | Jones | H01S 3/2383 359/337.11 |
| 2007/0274723 A1* | 11/2007 | Pegg | H04B 10/0775 398/83 |
| 2012/0141121 A1* | 6/2012 | Itoh | H04B 10/294 398/34 |
| 2014/0376918 A1* | 12/2014 | Boduch | H04J 14/021 398/83 |
| 2015/0341135 A1* | 11/2015 | Xia | H04J 14/0212 398/83 |
| 2016/0365921 A1* | 12/2016 | Costantini | H04B 10/564 |

\* cited by examiner

*Primary Examiner* — Leslie C Pascal
(74) *Attorney, Agent, or Firm* — Cooley LLP (57) ABSTRACT

In some embodiments, an apparatus includes a reconfigurable optical add-drop multiplexer (ROADM). The ROADM has a wavelength selective switch (WSS) that does not perform power equalization when the WSS is operative. The ROADM also has a first pre-amplifier, a first channel power equalizer operatively coupled to the first pre-amplifier, a second pre-amplifier operatively coupled to the first channel power equalizer and the WSS, a first post-amplifier operatively coupled to the WSS, a second channel power equalizer operatively coupled to the first post-amplifier, and a second post-amplifier operative coupled to the second channel power equalizer.

17 Claims, 8 Drawing Sheets

METHODS AND APPARATUS FOR SEPARATING THE WAVELENGTH SWITCHING FUNCTION FROM THE CHANNEL EQUALIZATION FUNCTION IN A RECONFIGURABLE OPTICAL ADD/DROP MULTIPLEXER (ROADM)

FIELD

One or more embodiments relate to the methods and apparatus for separating the wavelength switching function from the channel equalization function in a reconfigurable optical add/drop multiplexer (ROADM).

BACKGROUND

The widespread implementation of communication devices has increased network traffic and the need for higher bandwidth. In known communication systems, for managing large, continuous and error-free data traffic, the networks use different network topologies. These network topologies generally include multiple interconnected nodes. Attempts are being made to improve the existing networks by developing communication systems that can support more complex network topologies and greater network bandwidths.

Fiber-optic communication is typically used presently due to its large data bandwidth and fast data transfer. One commonly implemented method to increase data bandwidth is through Dense Wavelength Division Multiplexing (DWDM), which is used to multiplex data from different optical sources together on each optical fiber, with each optical signal having its own separate light wavelength. Known optical communication systems based on the DWDM technology typically include one or more reconfigurable optical add/drop multiplexer nodes (ROADM nodes) each of which typically has multiple ROADM cards. A typical ROADM card includes a Wavelength Selective Switch (WSS) that performs both wavelength selection and channel power equalization.

Other optical transmission systems use coherent technology for high data rate signals (e.g., 100 Gb/s & higher). Such coherent optical transmission systems are much less tolerant to optical signal to noise ratio (OSNR), and to impairments such as polarization dependent loss (PDL) when compared to non-coherent optical transmission systems. Coherent optical communication systems are expected to have very high port count (~40 or more) ROADMs. But, the known ROADMs typically do not scale well beyond about 20 ports because as the number of ports increases, at some point the optical performance of the wavelength selective switches (WSSs) of the ROADMs degrades precipitously.

Thus, a need exists for ROADMs with higher port counts with improved signal-to-noise ratios and lower optical system penalties.

SUMMARY

In some embodiments, an apparatus includes a reconfigurable optical add-drop multiplexer (ROADM). The ROADM has a wavelength selective switch (WSS) that does not perform power equalization when the WSS is operative. The ROADM also has a first pre-amplifier, a first channel power equalizer operatively coupled to the first pre-amplifier, a second pre-amplifier operatively coupled to the first channel power equalizer, a first post-amplifier operatively coupled to the WSS, a second channel power equalizer operatively coupled to the first post-amplifier, and a second post-amplifier operative coupled to the second channel power equalizer.

DETAILED DESCRIPTION

DWDM based-networks facilitate the transmission of optical signals via multiple optical channels (e.g., DWDM channels) in a fiber optical network(s). Each channel is differentiated by its unique wavelength. A reconfigurable optical add-drop multiplexer (ROADM) is an element in the DWDM network, and performs various functions such as adding, dropping, passing or redirecting the optical channels of various wavelengths in the fiber optic network(s), through the performance of wavelength selection, channel power equalization and optical channel amplification.

Wavelength selection is typically performed by a wavelength selection switch (WSS) in each ROADM card of a ROADM. The WSS is used for channel selection and channel routing. For example, in FIG. 2A described below, WSS performs the task of channel routing for the received channels at the LINE IN 142, and also performs the task of channel selection among the multiple channels received through the Degree (OUT) (such as 154 and 158).

Channel power equalization by the ROADM is typically performed to adjust the power levels of multiple optical channels of different wavelength in an optical beam. The channel power equalization is performed by attenuating the intensity of one or more optical channels to a uniform level (or to a target profile) across the various optical channels. The channel power equalization can be implemented, for example, by a wavelength blocker, a WSS (separate from the WSS performing channel selection and channel routing) or any other appropriate device capable of performing optical channel attenuation for the channel power equalization.

Optical channel amplification by the ROADM can be performed to strengthen a weak optical channel(s) by using optical amplifier(s). The weak optical channel is subjected to amplification both before transmission over the optical fiber network and after receiving the optical signals that have been weakened because of its transmission via the optical fiber network. Multiple amplifiers can be used to achieve the desired channel power, essentially, to transmit optical signals for the optical channel through the optical fiber network with less of an effect due to the noise. The received optical signals for the optical channel are subjected to amplification to enable further signal processing such as retransmission or reception. The optical amplifiers can be for example Erbium-Doped Fiber Amplifiers (EDFAs), Raman amplifiers and semiconductor optical amplifiers (SOAs).

As described here, the channel power equalization and wavelength selection functions of a ROADM are implemented using separate and dedicated hardware devices, such as channel power equalizer and WSS, respectively. Such an embodiment(s) provides the following benefits. The channel power equalization can be performed at a point in the ROADM that impacts optical system performance to a minimal extent and substantially maintains the signal-to-noise ratio. The WSS can be exclusively optimized (or configured) for the purpose of wavelength selection. This allows the channel power equalizer to be separately optimized (or configured) for the purpose of improving the signal-to-noise ratio by mitigating the noise accumulation in the ROADM. By separating the wavelength selection function and the channel power equalization, it is feasible to have a WSS dedicated to switching, routing, and selecting of channels only (without performing power equalization) and with a higher port count (~40 or more) as compared to the WSS used in the known systems that has a relatively lower port count (~20 or less). It is thus feasible to have ROADMs with a higher port-count (~40 or more) as compared to the ROADMs based on the known systems that have a relatively lower port count (~20 or less).

Figure 1:
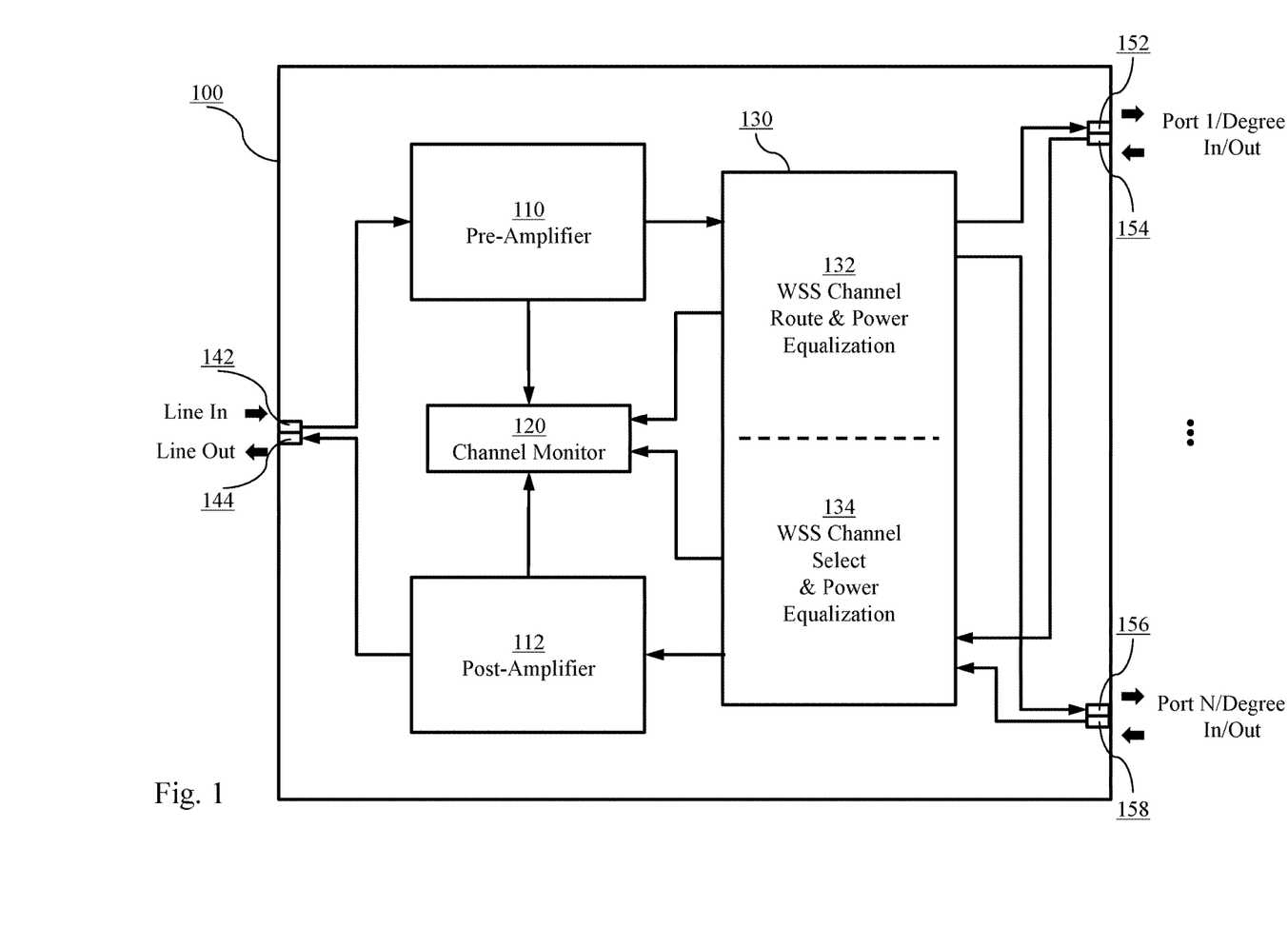
FIG. 1 illustrates an example of a known reconfigurable optical add/drop multiplexer (ROADM) card.

FIG. 1 illustrates an example of a known reconfigurable optical add/drop multiplexer (ROADM) card 100. ROADM card 100 includes two amplifiers, pre-amplifier 110 and post-amplifier 112. Both pre-amplifier 110 and post-amplifier 112 are physically coupled to the wavelength selective switch (WSS) 130. The wavelength selective switch 130 has two functions: WSS Channel Route & Power Equalization 132 and WSS Channel Select & Power Equalization 134. WSS Channel Route & Power Equalization 132 relates to the channel received at the Line IN 142; WSS Channel Select & Power Equalization 134 relates to the channel is to be transmitted through Line OUT 144. The channel monitor 120 receives a feedback signal from each of pre-amplifier 110, post-amplifier 112, WSS Channel Route & Power Equalization 132 and WSS Channel Select & Power Equalization 134. The channel(s) (or optical signals) enters the ROADM card 100 through Line IN 142 and/or Port (IN) (such as 154 and 158). The channel(s) (or optical signals) exits the ROADM card 100 through Line OUT 144 and/or Degree (OUT) (such as 152 and 156).

Channel monitor 120 can be, for example, a hardware device and/or software (executed on a processor) capable of performing one or more functions of monitoring the various components of the ROADM card 100 and providing feedback to alter the behavior of the WSS 130 of the ROADM card 100, as described herein. The channel monitor 120 receives feedback optical signals from pre-amplifier 110, post-amplifier 112, WSS Channel Route & Power Equalization 132 and WSS Channel Select & Power Equalization 134. Based on these feedback signals, channel monitor 120 sends electrical signals to WSS 130 to alter the channel power equalization process. When implemented as a hardware device, the channel monitor 120 can include, for example, one or more photodetectors and/or one or more optical filters, a general purpose processor, a field-programmable gate array (FPGA), an application specific integrated circuit (ASIC), a digital signal processor (DSP), and/or the like. Such a processor can access memory that can store software-based instructions (or computer code) that can be executed by the processor to perform the functions of channel monitor 120.

Multiple ROADM cards can be included within a given ROADM node (not shown in FIG. 1). These multiple ROADM cards can be interconnected with each other through Port (IN)/Degree (OUT) ports (such as 152 and 154, respectively) of ROADM card 100. As shown in FIG. 1, the Port 1(IN) 154 is an input port for receiving at the ROADM card 100 a signal generated at the ROADM node that includes ROADM card 100; Degree 1(OUT) 152 is an output port for local routing from ROADM card 100. Additionally, for a ROADM with 'N' cards, the ROADM card 100 will be coupled to the $n^{th}$ ROADM card through Port (IN) 158 and Degree (Out) 156.

The WSS Channel Route & Power Equalization 132 receives input from the Line IN 142 via the pre-amplifier 110. The pre-amplifier 110 amplifies the received optical signals for the associated optical channel. The WSS Channel Route & Power Equalization 132 then performs channel route selection and further sends the output to the various Degree (OUT) ports (such as 152 and 156). The WSS Channel Select & Power Equalization 134 receives inputs from Port (IN) (such as 154 and 158). The WSS Channel Select & Power Equalization 134 then selects the appropriate optical channel and performs channel power equalization. Next, the optical signal is sent to the post-amplifier 112 for amplification and then to Line OUT 144.

The ROADM node having the ROADM card 100 is not ideal from an optical system performance and noise accumulation point of view because the "channel power equalization" functionality performed by WSS Channel Route & Power Equalization 132 induces signal attenuation that could otherwise be implemented post-amplification. The "wavelength selection" functionality of WSS Channel Select & Power Equalization 134 involves assembling a DWDM signal to be amplified and transmitted (i.e. to be implemented pre-amplification). The wavelength selection function and the channel power equalization function have competing optical performance requirements in optical design, making it difficult for the known ROADM to provide both functionalities within the WSS and at the same time meet tighter specifications in coherent optical systems for high port counts (e.g., at least 40 ports) and for high data rates (e.g., 100 Gb/s & higher). Accordingly, the embodiment shown with respect to FIG. 2A provides an alternative design that can provide improved performance of the specifications in coherent optical systems for high port counts (e.g., up to 40 ports or more) and for high data rates (e.g., 100 Gb/s & higher).

Figure 2A:
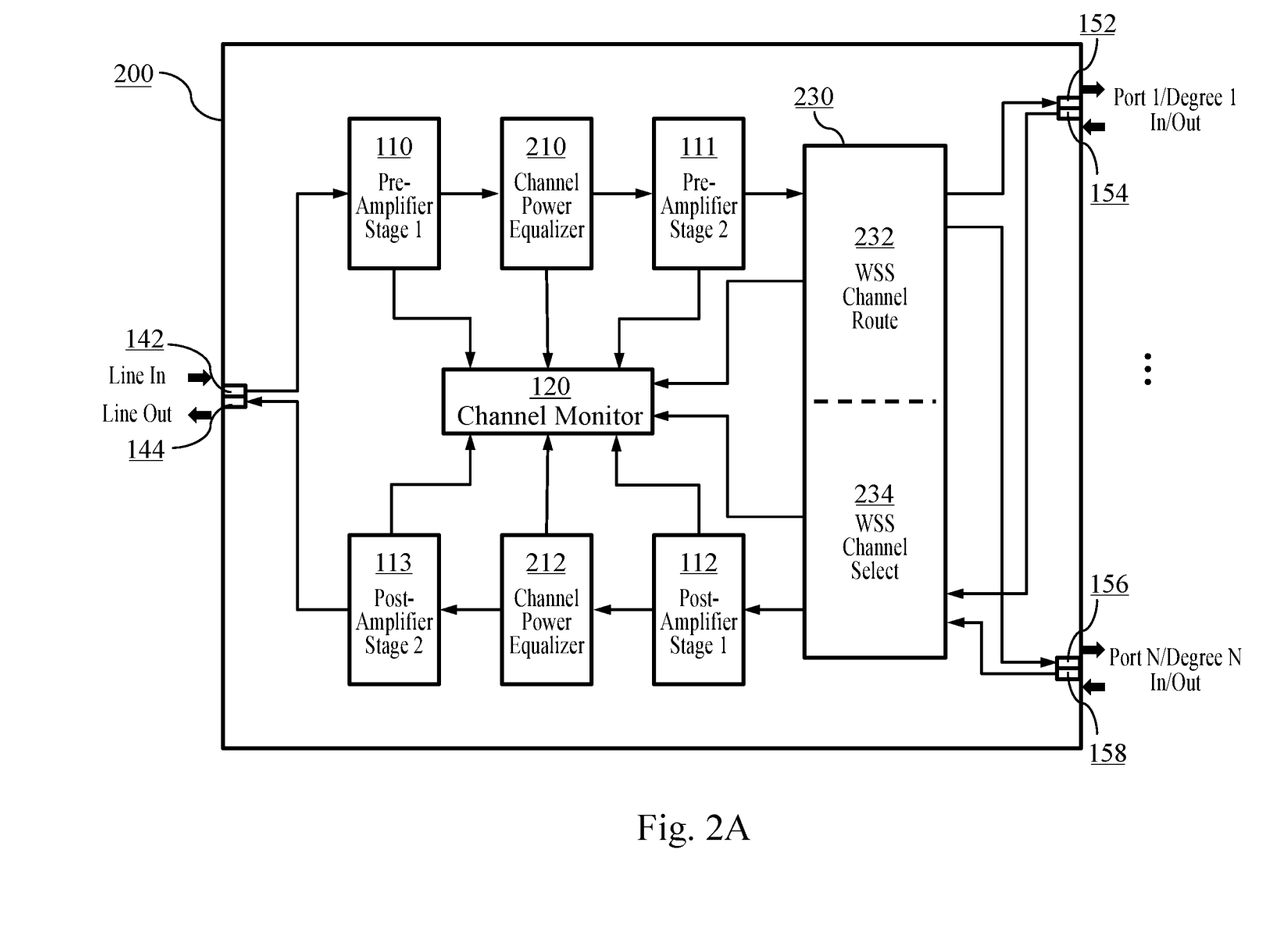
FIG. 2A illustrates an example of a ROADM card, according to an embodiment.

FIG. 2A illustrates an example of a ROADM card 200, according to an embodiment. The ROADM card 200 includes two sets of amplifiers, a set of pre-amplifiers (110 and 111) and a set of post-amplifiers (112 and 113). Both the pre-amplifiers (110 and 111) and the post-amplifiers (112 and 113) are operatively coupled to the wavelength selective switch (WSS) 230. The wavelength selective switch 230 performs WSS Channel Route 232 and WSS Channel Select 234. WSS Channel Route 232 relates to the channel received at the Line IN 142; WSS Channel Select 234 relates to the channel to be transmitted through Line OUT 144. The channel power equalizer 210 performs power equalization on the optical channel in between the pre-amplification stages (110 and 111) of the optical channels. Similarly, the channel power equalizer 212 performs power equalization on the optical channel in between the post-amplification stages (112 and 113) of the optical channels. The channel monitor 120 receives a feedback optical signal from some or all of pre-amplifiers 110 and 111, post-amplifiers 112 and 113, channel power equalizers 210 and 212, WSS Channel Route 232 and WSS Channel Select 234.

Figure 3:
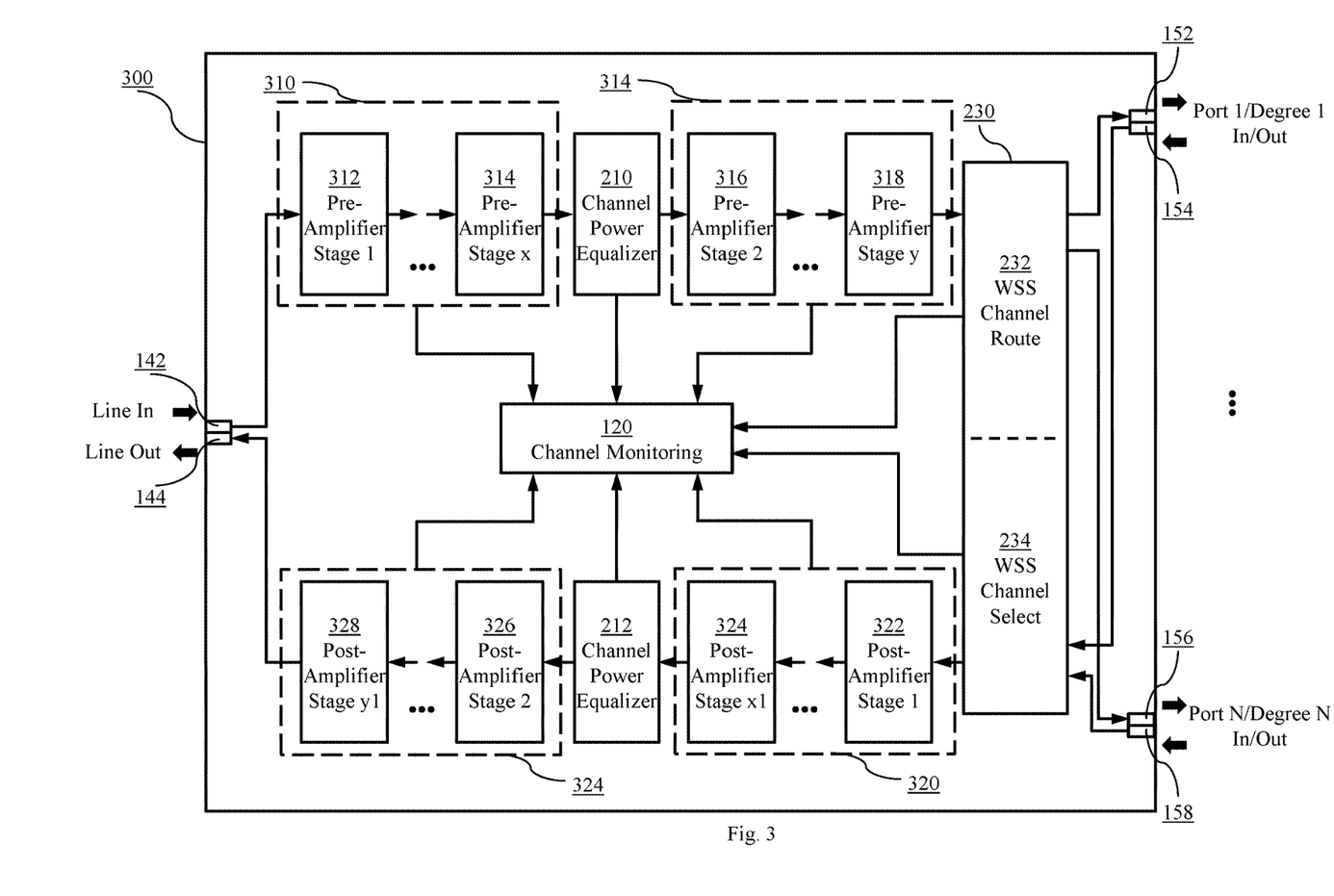
FIG. 3 illustrates an example of a ROADM card including multiple amplification stages, according to another embodiment.

The channel(s) (or optical signals) enters the ROADM card 200 through Line IN 142 and/or Ports (IN) (such as 154 through 158). The channel(s) (or optical signals) exits the ROADM card 200 through Line OUT 144 and/or Degree (OUT) (such as 152 and 156). Although the FIGS. 2 and 3 illustrate only two ports namely, Port 1 (IN)/Degree 1 (OUT) and Port N (IN)/Degree N (OUT), it is understood that an actual implementation can include multiple ports ranging from 1 to N, where N is a natural number (e.g., N can be 40). Furthermore, the description here regarding the functioning of the ROADM using Port 1 (IN)/Degree 1 (OUT) is also applicable to the other ports for up to N ports.

ROADMs are associated with a transmission fiber pair and can be described in terms of degrees of switching direction. Typically, the degrees range from a minimum of two to as many as eight degrees, and occasionally more than eight degrees. For example, a two-degree ROADM switches in two directions. For another example, a four-degree ROADM switches in four directions. In a ROADM having multiple ROADM cards 200, each degree of the ROADM involves a ROADM card 200 with its own WSS 230, and its own channel power equalizers 210 and 212. It should be understood that not all degrees of a ROADM have to be in use at any given time; rather it is possible that a ROADM can have multiple degrees but only a subset are in use at a given time.

Figure 2B:
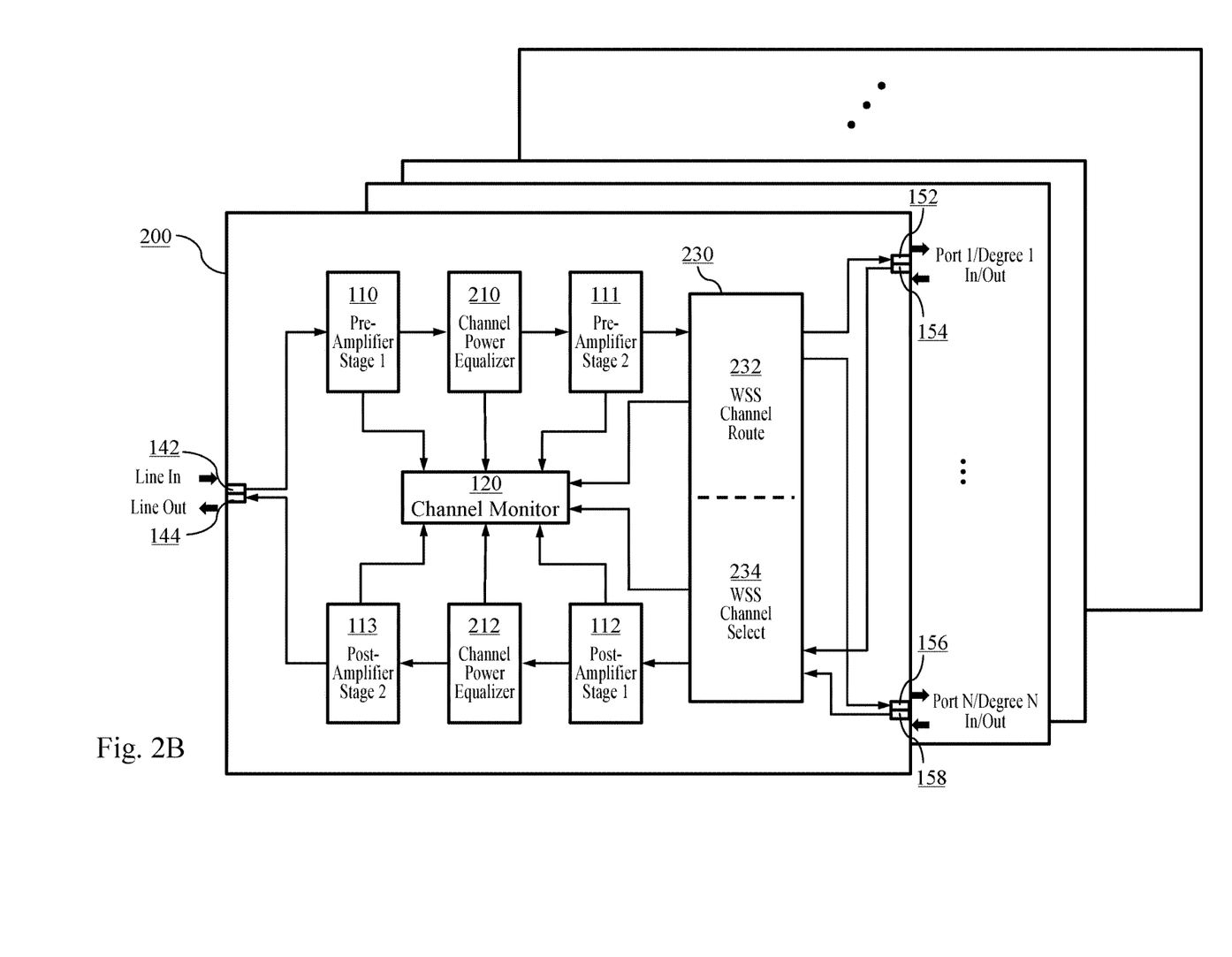
FIG. 2B illustrates an example of a ROADM node having multiple ROADM cards, according to an embodiment.

Multiple ROADM cards can be included within a given ROADM node (shown in FIG. 2B). These multiple ROADM cards can be interconnected with each other through Port (IN)/Degree (Out) ports (such as 152 and 154, respectively) of ROADM card 200. As shown in FIG. 2A, the Port 1(IN) 154 is an input port for receiving at the ROADM card 200 a signal generated at another ROADM card within the ROADM node; Degree 1(OUT) 152 is an output port for routing from ROADM card 200 to another ROADM card within the ROADM node. Additionally, for a ROADM node with 'N' cards, the ROADM card 200 will be coupled to the $n^{th}$ ROADM card through Port (IN) 158 and Degree (Out) 156.

The WSS Channel Route 232 receives input from the Line IN 142 via the pre-amplifiers 110 and the channel power equalizer 210. The optical signal(s) for each optical channel is received at the stage 1 pre-amplifier 110, which amplifies the received optical signal(s) for the associated optical channel(s). The pre-amplified optical signal(s) for each optical channel is then provided to the channel power equalizer 210, which performs power equalization on the received optical signal(s) for each optical channel. Next, the optical signal(s) for each optical channel is sent to the stage 2 pre-amplifier 110 and then sent to the WSS Channel Route 232. The WSS Channel Route 232 then performs channel route selection and further outputs the optical signal(s) for each optical channel to the various Degree (OUT) ports (such as 152 and 156).

The WSS Channel Select 234 receives input from Port (IN) (such as 154 and 158). The WSS Channel Select 234 then selects the appropriate optical channel(s) and transmits the optical signal(s) for the selected optical channel(s) to the stage 1 post-amplifier 112 for amplification. Next, the optical signal(s) for the selected optical channel(s) is sent to the channel power equalizer 210, which performs power equalization on the various optical channels. The optical signal(s) for the various power-equalized optical channels is further sent to the stage 2 post-amplifier 112 for amplification and then to Line OUT 144.

In one of the embodiment, the channel power equalizer 210 is operatively coupled with pre-amplifiers 110 during the reception of the optical channel through Line IN 142. The channel power equalizer 212 is operatively coupled with post-amplifiers 112 during the transmission of the optical channel through Line OUT 144. Although FIG. 2A shows channel power equalization performed by the channel power equalizers (210 and 212), it should be understood that the channel power equalizers (210 and 212) can be implemented, for example as shown in FIG. 2D, by a wavelength blocker, a WSS (210' and 212'), or any other appropriate device capable of performing optical channel power adjustment (via attenuation for example) for channel power equalization. In other words, the channel power equalizers can be implemented by any type of appropriate optical device that is capable of manipulating certain spectral slides of optical power independent of other spectral slices of the same optical power. It is further understood that the channel power equalizers (210 and 212) can be physically implemented in a single optical module or in two separate modules.

Figure 2C:
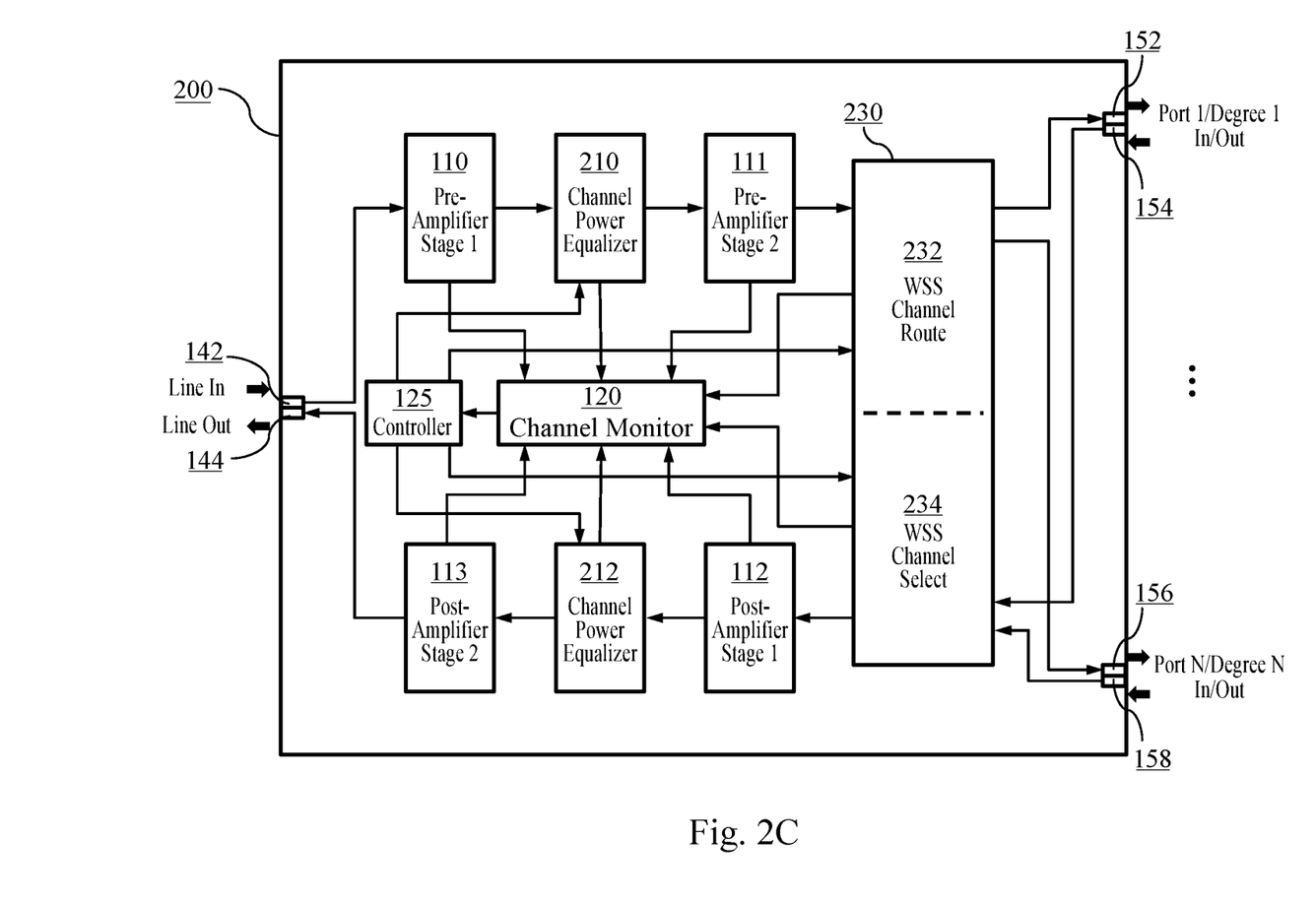
FIG. 2C illustrates an example of a ROADM card showing a controller, according to an embodiment.
Figure 2D:
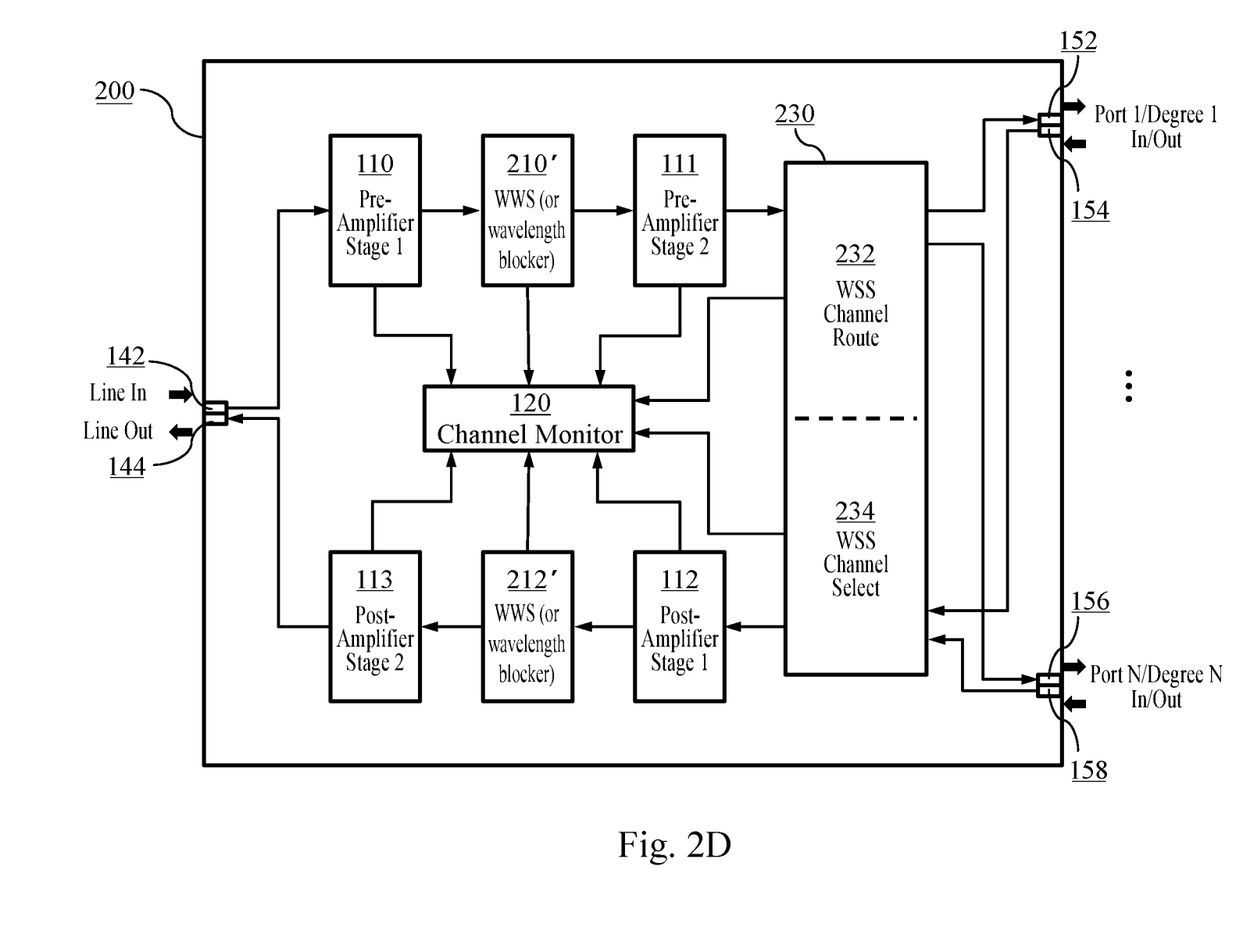
FIG. 2D illustrates an example of a ROADM card, according to another embodiment.

As shown in FIG. 2C, a ROADM card can include a controller 125, which receives a signal from the channel monitor 120. The controller 125 can send a control signal to the first channel power equalizer 210 and the WSS 232. Alternatively or in addition, the controller 125 can send a control signal to the second channel power equalizer 212 and WSS 234.

FIG. 3 illustrates an example of a ROADM card 300 including multiple amplification stages, according to another embodiment. The ROADM card 300 includes two amplifying stages, pre-amplifying stages (310 and 314) and post-amplifying stages (320 and 324). Both pre-amplifying stage 314 and post-amplifying stage 320 are operatively coupled to the wavelength selective switch (WSS) 230. WWS 230 performs WSS Channel Route 232 and WSS Channel Select 234. WSS Channel Route 232 relates to the channel received at the Line IN 142; WSS Channel Select 234 relate to the channel is to be transmitted through Line OUT 144. The channel power equalizers (210 and 212) perform power equalization on the optical channel(s) in between the amplification stages (310 & 314 and 320 & 324) of the optical channel. The channel monitor 120 receives a feedback optical signal from some or all of pre-amplifier stages (310 and 314), post-amplifier stages (320 and 324), channel power equalizers (210 and 212), WSS Channel Route 232 and WSS Channel Select 234. The optical signal(s) for the associated optical channels is received at the ROADM card 300 through Line IN 142 and/or Port (IN) (such as 154 and 158). The optical signal(s) for the associated optical channels exits the ROADM card 300 through Line OUT 144 and/or Degree (OUT) (such as 152 and 156).

Multiple ROADM cards can be included within a given ROADM node (not shown in FIG. 3). These multiple ROADM cards can be interconnected with each other through Port (IN)/Degree (Out) ports (such as 152 and 154, respectively) of ROADM card 300. As shown in FIG. 3, the Port 1(IN) 154 is an input port for receiving at the ROADM card 300 a signal generated at another ROADM card within the ROADM node; Degree 1(OUT) 152 is an output port for routing from ROADM card 300 to another ROADM card within the ROADM node. Additionally, for a ROADM node with 'N' cards, the ROADM card 300 will be coupled to the $n^{th}$ ROADM card through Port (IN) 158 and Degree (Out) 156.

The WSS Channel Route 232 receives input from the Line IN 142 via the pre-amplifiers stage 310, the channel power equalizer 210 and the pre-amplifiers stage 314. The optical signal(s) is received at the pre-amplifier stage 310, which amplifies the received optical signal(s) for the associated optical channel(s). The pre-amplified optical signal(s) for the associated optical channel(s) is then provided to the channel power equalizer 210, which performs power equalization on the received optical signal(s) for the associated optical channel(s). Next, the optical signal(s) is sent to the pre-amplifier stage 314 and then sent to the WSS Channel Route 232. The WSS Channel Route 232 then performs channel route selection and further outputs the optical signal(s) for the associated optical channel(s) to the various Degree (OUT) ports (such as 152 and 156).

The WSS Channel Select 234 receives input from Port (IN) (such as 154 and 158). The WSS Channel Select 234 then selects the appropriate optical channel(s) and transmits the optical signal(s) for the selected optical channel(s) to the stage 1 post-amplifier 320 for amplification. Next, the optical signal(s) for the selected optical channel(s) is sent to the channel power equalizer 212, which performs power equalization on the various optical channels. The optical signal(s) for the various power-equalized channels is further sent to the next stage post-amplifier 324 for amplification and then to Line OUT 144.

In one of the embodiment, the channel power equalizer 210 is coupled with pre-amplifier stage (310 and 314) during the reception of the optical channel through Line IN 142, while the channel power equalizer 212 is coupled with post-amplifier stage (320 and 324) during the transmission of the optical channel through Line OUT 144. Although FIG. 3 shows channel power equalization performed by the channel power equalizer (210 and 212), it should be understood that the channel power equalizer (210 and 212) can be implemented, for example, by a wavelength blocker, a WSS or any other appropriate device capable of performing optical channel power adjustment (via power adjustment for example) for channel power equalization. It is further understood that the channel power equalizers (210 and 212) can be physically implemented in a single optical module or in two separate modules.

In one implementation, the amplifiers in the pre-amplification stage (310 and 314) and post-amplification stage (320 and 324) can be cascaded to obtain the desired optical gain. Further, it is understood that the cascading of the optical amplifiers is design dependent and may vary based on the desired performance.

Figure 4:
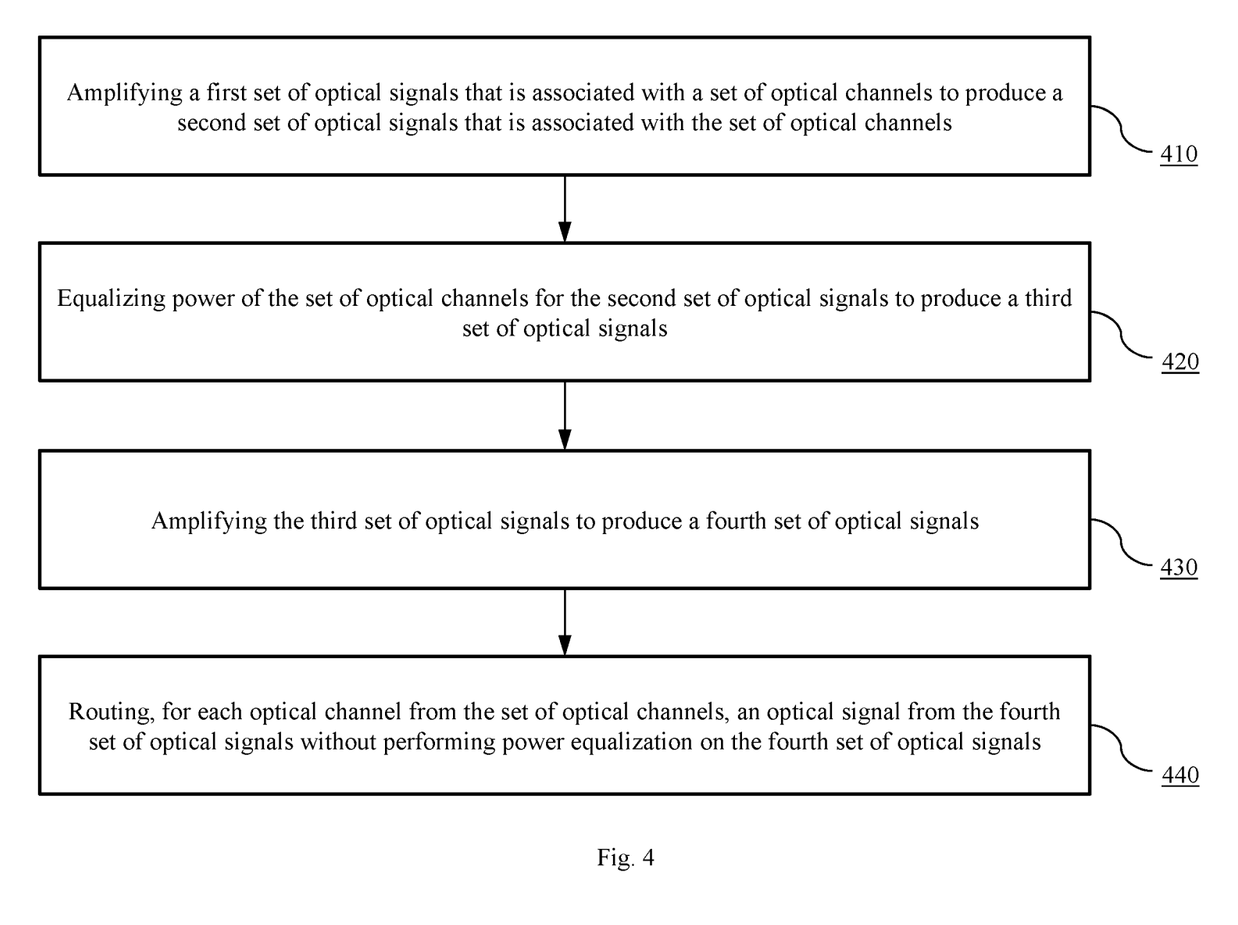
FIG. 4 illustrates a flow chart for a method implemented on the ROADM card when the optical signal is received at Line IN, according to an embodiment.

FIG. 4 illustrates a flow chart for a method implemented on the ROADM card when the optical signal is received at Line IN, according to an embodiment. For example, FIG. 4 can be performed on optical signals received at Line IN 142 of the ROADM cards 200 and 300 of FIGS. 2A and 3, respectively. At 410, a first set of optical signals associated with a set of optical channels are amplified to produce a second set of optical signals associated with the set of optical channels. For example, for the ROADM card 200 shown in FIG. 2A, the optical signals received at Line IN 142 can be amplified using optical pre-amplifier 110.

At 420, the set of optical channels for the second set of optical signals are subjected to the process of channel power equalization to produce a third set of optical signals. During this process, the power of one or more optical signals from the second set of optical signals are adjusted (via attenuation as an example) to a common power level (or target power profile). For example, for the ROADM card 200 shown in FIG. 2A, the optical signals received at channel power equalizer 210 can be power equalized to produce optical signals output from the channel power equalizer 210.

At 430, the third set of optical signal are amplified to produce a fourth set of optical signals. For example, for the ROADM card shown in FIG. 2A, the optical signals received at the pre-amplifier 111 are amplified and sent to the WSS 232.

At 440, for each optical channel from the set of optical channels, an optical signal from the fourth set of optical signals is routed to one or more of the output ports/degrees (such as 152 and 156) without performing equalization on the fourth set of optical signals. For example, for the ROADM card shown in FIG. 2A, the WSS 232, for each optical channel from the set of optical channels, routes that channel to one or more of the output ports/degrees (such as 152 and 156). WSS 232 does not perform power equalization on the routed optical signals.

Figure 5:
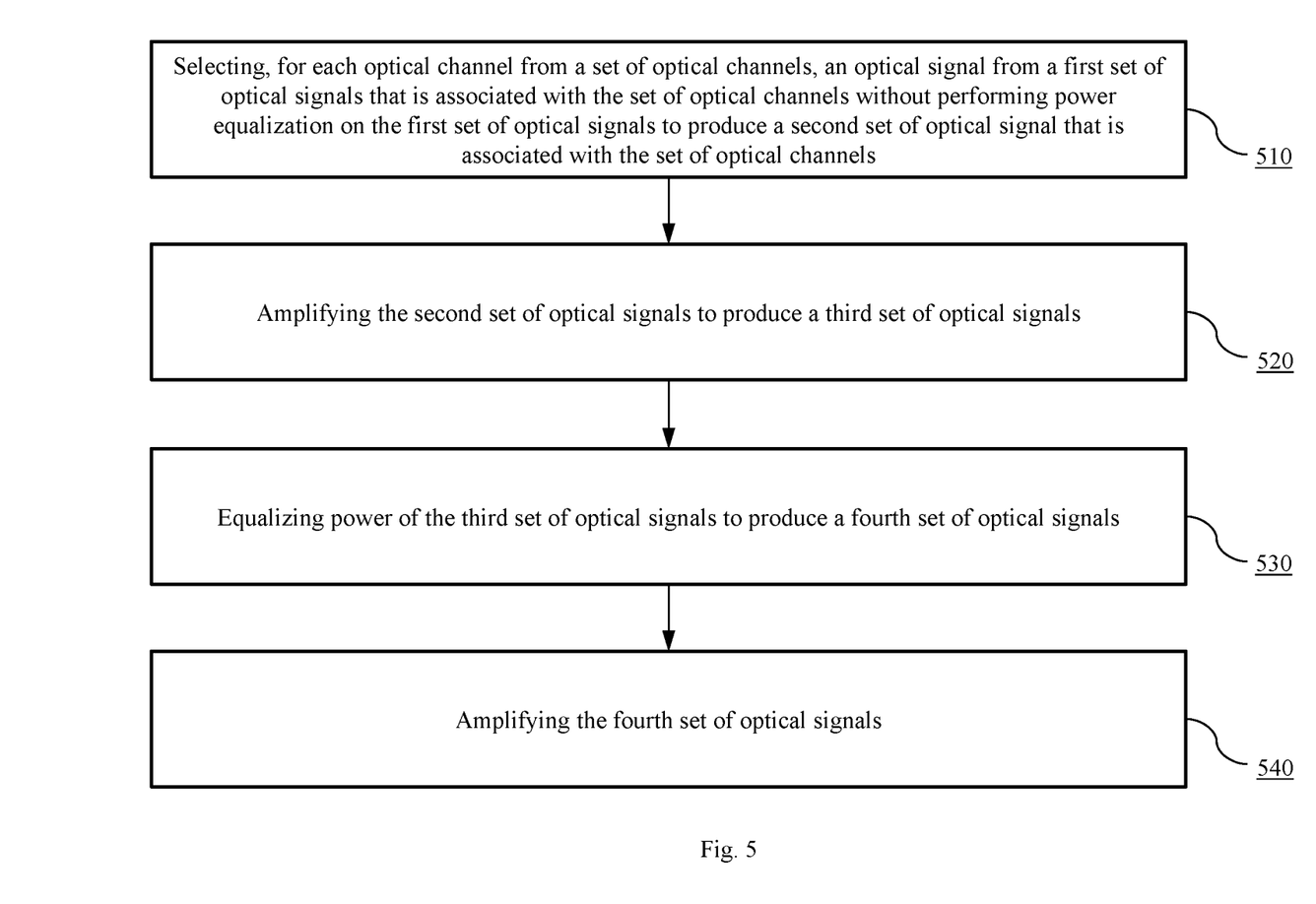
FIG. 5 illustrates a flow chart for a method implemented on the ROADM card when the optical signal is to be sent through Line OUT, according to an embodiment.

FIG. 5 illustrates a flow chart for a method implemented on the ROADM card when the optical signal is to be sent through Line OUT, according to an embodiment. At 510, for each optical channel (each optical wavelength) from all sets of optical channels presented at ROADM port/degree IN (such as 154 and 158), an optical signal from a first set of optical signals is selected to produce a second set of optical signals; this selection is performed without performing power equalization on the first set of optical signals. For example, for the ROADM card 200 of FIG. 2A, WSS 234 selects, for each optical channel from a set of optical channels, an optical signal from multiple optical signals associated with an optical channel, without performing power equalization on the selected optical signals.

At 520, the second set of optical signals is amplified to produce a third set of optical signals. For example, for the ROADM card 200 of FIG. 2A, post-amplifiers 112 can receive and amplify the optical signals received from WSS 234. Post amplifier 112 can then provide the amplified optical signals to channel power equalizer 212.

At 530, the third set of optical signals can be subjected to power equalization to produce a fourth set of optical signals. During this process, the power of one or more optical signals from the third set of optical signals are adjusted (via attenuation as an example) to a common power level (or a target power profile). For example, for the ROADM card 200 shown in FIG. 2A, the optical signals received at channel power equalizer 212 can be power equalized to produce optical signals output from the channel power equalizer 212 and provided to post-amplifier 113.

At 540, the fourth set of optical signals are amplified. For example, for the ROADM card 200 of FIG. 2A, post-amplifier 113 can receive the fourth set of optical signals from the channel power equalizer 212 and amplified the fourth set of optical signals. These amplified optical signals can then be sent to the network.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. An apparatus, comprising:
   a reconfigurable optical add-drop multiplexer (ROADM) having:
      a plurality of input/output ports;
      a wavelength selective switch (WSS) operatively coupled to the plurality of input/output ports without an amplifier between the WSS and the plurality of input output ports, the WSS does not perform power equalization when the WSS is operative,
      the WSS is configured to select, for each optical channel from a plurality of optical channels, an optical signal from a first plurality of optical signals without optimizing collectively for input power disparity, insertion loss, polarization dependent loss and extinction ratio of the first plurality of optical signals, the first plurality of optical signals being associated with a first direction,
      the WSS is configured to select, for each optical channel from the plurality of optical channels, an optical signal from a second plurality of optical signals without optimizing collectively for input power disparity, insertion loss, polarization dependent loss and extinction ratio of the second plurality of optical signals, the second plurality of optical signals being associated with a second direction different from the first direction,
      a first pre-amplifier associated with the first plurality of optical signals and not the second plurality of optical signals,
      a first channel power equalizer operatively coupled to the first pre-amplifier, the first channel power equalizer being associated with the first plurality of optical signals and not the second plurality of optical signals,
      a second pre-amplifier operatively coupled to the first channel power equalizer and the WSS, the second pre-amplifier being associated with the first plurality of optical signals and not the second plurality of optical signals,
      a first post-amplifier operatively coupled to the WSS, the first post-amplifier being associated with the second plurality of optical signals and not the first plurality of optical signals,
      a second channel power equalizer operatively coupled to the first post-amplifier, the second channel power equalizer being associated with the second plurality of optical signals and not the first plurality of optical signals, and
      a second post-amplifier operative coupled to the second channel power equalizer, the second post-amplifier being associated with the second plurality of optical signals and not the first plurality of optical signals.

2. The apparatus of claim 1, wherein the ROADM further has a channel monitor configured to receive a portion of an optical signal produced by the second channel power equalizer and a portion of an optical signal produced by the WSS, the channel monitor configured to send a signal to a controller such that the second channel power equalizer and the WSS receive a control signal from the controller.

3. The apparatus of claim 1, wherein:
   the first pre-amplifier is configured to amplify the first plurality of optical signals to an amount optimal for the first channel power equalizer to equalize the first plurality of optical signals,
   the first post-amplifier is configured to amplify the second plurality of optical signals to an amount optimal for the second channel power equalizer to equalize the second plurality of optical signals.

4. The apparatus of claim 1, wherein:
   the first pre-amplifier is configured to amplify the first plurality of optical signals to an amount optimal for the first channel power equalizer to equalize the first plurality of optical signals to produce a third plurality of optical signals,
   the second pre-amplifier is configured to amplify the third plurality of optical signals to an amount greater than the amount for the first pre-amplifier,
   the first post-amplifier is configured to amplify the second plurality of optical signals to an amount optimal for the second channel power equalizer to equalize the second plurality of optical signals to produce a fourth plurality of optical signals,
   the second post-amplifier is configured to amplify the fourth plurality of optical signals to an amount greater than the amount for the first post-amplifier.

5. The apparatus of claim 1, wherein:
   the ROADM is a ROADM node having a plurality of ROADM cards including a first ROADM card,
   the first ROADM card including the WSS, the first pre-amplifier, the first channel power equalizer, the second pre-amplifier, the first post-amplifier, the second channel power equalizer, and the second post-amplifier operatively coupled to the second channel power equalizer.

6. The apparatus of claim 1, wherein:
   the ROADM is a ROADM node having a plurality of ROADM cards including a first ROADM card, each ROADM card from the plurality of ROADM cards being operatively coupled to each remaining ROADM card from the plurality of ROADM cards, each ROADM card from the plurality of ROADM cards having a plurality of degrees, a number of ROADM cards within the plurality of ROADM cards being equal to the number of degrees in the plurality of degrees, the first ROADM card including the WSS, the first pre-amplifier, the first channel power equalizer, the second pre-amplifier, the first post-amplifier, the second channel power equalizer, and the second post-amplifier operative coupled to the second channel power equalizer.

7. The apparatus of claim 1, wherein:

the first channel power equalizer is at least one of a second WSS or a first wavelength blocker, the second channel power equalizer is at least one of a third WSS or a second wavelength blocker.

8. The apparatus of claim 1, wherein the ROADM further has a channel monitor configured to receive a portion of an optical signal produced by the first channel power equalizer and a portion of an optical signal produced by the WSS, the channel monitor configured to send a signal to a controller such that the first channel power equalizer and the WSS receive a control signal from the controller.

9. A method, comprising:

amplifying, at a reconfigurable optical add-drop multiplexer (ROADM) card, a first plurality of optical signals that is in a first direction and that is associated with a first plurality of optical channels to produce a second plurality of optical signals that is associated with the first plurality of optical channels;

equalizing, at the ROADM card, power of the first plurality of optical channels for the second plurality of optical signals to produce a third plurality of optical signals;

amplifying, at the ROADM card, the third plurality of optical signals to produce a fourth plurality of optical signals;

routing, at a wavelength selective switch (WSS) of the ROADM card and for each optical channel from the first plurality of optical channels, an optical signal from the fourth plurality of optical signals to an input/output port from a plurality of input/output ports of the ROADM card without an amplifier between the WSS and the plurality of input/output ports and without performing power equalization on the fourth plurality of optical signals;

selecting, at a WSS at the ROADM card and for each optical channel from a second plurality of optical channels, an optical signal from a fifth plurality of optical signals that is in a second direction opposite the first direction and that is associated with the second plurality of optical channels and that is received from an input/output port from the plurality of input/output ports of the ROADM card without an amplifier between the WSS and the plurality of input/output ports and without performing power equalization on the fifth plurality of optical signals to produce a sixth plurality of optical signals that is associated with the second plurality of optical channels;

amplifying, at the ROADM card, the sixth plurality of optical signals to produce a seventh plurality of optical signals;

equalizing, at the ROADM card, power of the seventh plurality of optical signals to produce an eighth plurality of optical signals; and amplifying, at the ROADM card, the eighth plurality of optical signals.

10. The method of claim 9, wherein:

equalizing the power of the second plurality of optical signals is performed by a channel power equalizer, physically distinct from the channel power equalizer.

11. The method of claim 9, wherein:

the amplifying of the first plurality of optical signals includes amplifying the first plurality of optical signals to an amount optimal for equalizing the first plurality of optical signals.

12. The method of claim 9, wherein:

the amplifying the first plurality of optical signals includes amplifying the first plurality of optical signals to an amount optimal for equalizing the first plurality of optical signals, the amplifying the third plurality of optical signals includes amplifying the third plurality of optical signals to an amount greater than the amount for the first plurality of optical signals.

13. The method of claim 9, wherein the routing includes routing, for each optical channel from the plurality of optical channels, without optimizing collectively for input power disparity, insertion loss, polarization dependent loss and extinction ratio of the first plurality of optical signals.

14. The method of claim 9, wherein:

the equalizing the power of the seventh plurality of optical signals is performed by a channel power equalizer, the selecting is performed by a wavelength selective switch (WSS) that is physically distinct from the channel power equalizer.

15. The method of claim 9, wherein:

the amplifying the sixth plurality of optical signals includes amplifying the sixth plurality of optical signals to an amount optimal for equalizing the sixth plurality of optical signals.

16. The method of claim 9, wherein:

the amplifying the sixth plurality of optical signals includes amplifying the sixth plurality of optical signals to an amount optimal for equalizing the sixth plurality of optical signals, the amplifying of the eighth plurality of optical signals includes amplifying the eighth plurality of optical signals to an amount greater than the amount for the sixth plurality of optical signals.

17. The method of claim 9, wherein the selecting includes selecting, for each optical channel from the second plurality of optical channels, without optimizing collectively for input power disparity, insertion loss, polarization dependent loss and extinction ratio of the fifth plurality of optical signals.

* * * * *